Dec. 1, 1931.  L. A. MACKLANBURG  1,834,031
METALLIC WEATHER STRIP
Filed May 29, 1930
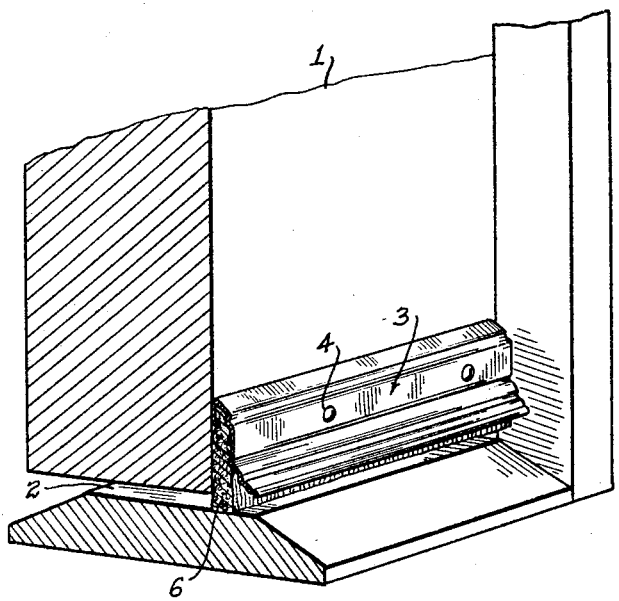
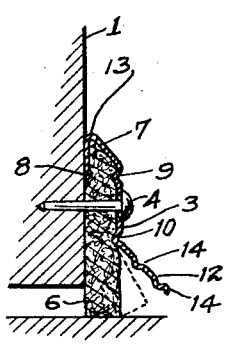
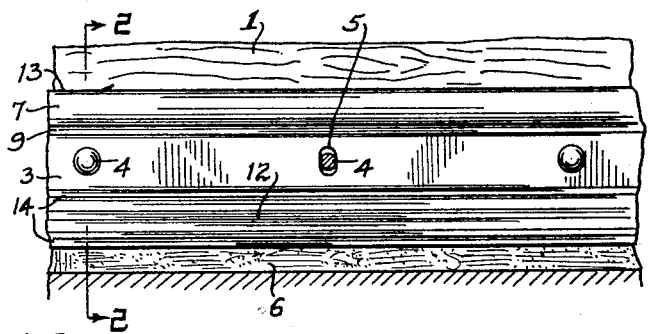
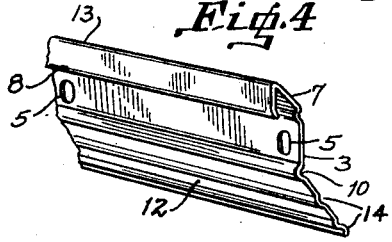
Inventor
Louis A. Macklanburg
By Mason Fenwick & Lawrence
Attorneys Patented Dec. 1, 1931

1,834,031

UNITED STATES PATENT OFFICE

LOUIS A. MACKLANBURG, OF OKLAHOMA CITY, OKLAHOMA

METALLIC WEATHER STRIP

Application filed May 29, 1930. Serial No. 457,282.

This invention relates to metallic weather strips and refers particularly to the strip at the base of the door designed to seal the crack between the base and the threshold.

The principal object of the invention is to provide a one-piece combined felt securing sheath and drip cap.

Another object of the invention is to provide a metallic sheath with novel means for securing and gripping the felt, said sheath being constructed at the top so as to deflect the rain which runs down the door, from the seam between the weather strip and door, said sheath being continued in the form of an outwardly inclined drip cap defining a line or region along which the felt may flex in opening and closing the door, and forming a canopy to house the flexed felt, preventing its becoming soaked.

Other objects of the invention will appear as the following preferred and practical embodiment thereof proceeds.

In the drawings in which the same characters of reference are used throughout the several figures to denote identical parts:

Figure 1 is a perspective view partly in section showing my improved combined weather strip and drip cap in assembled relation with respect to a door and threshold;

Figure 2 is a transverse section through the weather strip and a portion of the door;

Figure 3 is a front elevation; and

Figure 4 is a perspective view of the one-piece metallic portion of the combined weather strip and drip cap.

Referring now in detail to the several figures, the numeral 1 represents the door and 2 the threshold. The weather strip 3 is secured against the base of the door in any suitable manner, such as by the nails 4, and said nails preferably pass through elongated slots 5 formed in the weather strip so that the latter can be adjusted with respect to the threshold before imparting the final drive to the nails. It is, of course, obvious that screws may be used instead of nails, and the adjustment of the weather strip more simply accomplished.

The weather strip 3 comprises a felt portion 6 retained within a metallic sheath 7. The upper part of the felt portion 6 is clampably retained within the sheath 7 between the inturned free edge 8 which lies adjacent the door when the weather strip is in place and an indented bead 9 preferably in transverse alinement with the free edge 8. The edge 8 and the bead 9 are pressed into the felt during the process of manufacture of the weather strip. When the weather strip is nailed or otherwise secured to the door, another retaining element comes into play, namely the bead 10 which is compressed into the felt by the pressure of the nail. That part of the felt below the bead 10 is free to flex and said bead defines a longitudinal line or region about which the felt may flex as indicated in broken lines in Figure 2. The bead 10 also defines the line of demarcation between the sheath 7 and the drip cap 12 which latter member extends integrally from said sheath in an outwardly and downwardly inclined position as shown.

The weather strip is preferably formed at its upper part with an apex 13 fitting snugly against the door and functioning to deflect the rain which may run down the door so that the latter does not collect between the weather strip and door. The drip cap is preferably formed with longitudinal beads or corrugations 14, the purpose of which is to stiffen and prevent curling or warping of the drip cap.

It is obvious that the drip cap forms a canopy for shielding the free end of the felt portion, both in its straight and flexed position, preventing its becoming soaked and inflexible. Should the felt portion through misalinement or wear leave a clearance between itself and the threshold, the drip cap also prevents the blowing of rain beneath the door.

It might be noted that the sheath by which the flexible sealing strip 6 is held in place, has the inner flange thereof spaced a substantial distance above the lower edge or portion of the outer flange so that the sealing strip may have direct pressure contact with the closure 1. More specifically, the upper and lower beads 9 and 10 in the outer flange or wall of the sheath define an intervening attaching portion having means in the form of apertures for the accommodation of fastening devices and, as shown in Figure 2, the lower edge of the inner flange terminates above the attaching portion thus formed to allow the fastening nails or the like to force the inner surface of the sealing strip into direct pressure contact with the closure.

While I have in the above description, disclosed what I know to be a practical form of the invention, it is to be understood that the invention is not limited to the specific details of construction as shown, but that such changes and alterations in the construction and disposition of the parts may be practiced, as will come within the terms or sense of the appended claims.

What I claim is:

1. Weather strip comprising a felt portion and a metallic sheath including a top, and side flanges, embracing the upper part of said felt portion, one side flange having an inturned edge, the other side flange having a bead, opposite said inturned edge and cooperating therewith in the formation of a pair of fastening elements clamping the intervening portion of said felt, said top and the side with the inturned edge meeting at an acute angle, causing the top to slope transversely and shed water.

2. Weather strip comprising a felt portion and a metallic sheath including a top, and side flanges, embracing the upper part of said felt portion, leaving the lower portion of the felt free, one of said flanges being provided with a bead, between which, and the opposite flange the felt is clampably retained, the side flange having the bead being folded outwardly at a point spaced from said bead, to form a crease defining the line of flexion for said felt portion, and forming a horizontal drip cap overhanging, and normally spaced from the said free lower portion of felt, said drip cap having longitudinal reinforcing ribs.

3. Weather strip comprising a felt portion and a sheath including a top, and side flanges, embracing the upper part of said felt portion, one of said flanges being provided with a bead between which, and the opposite flange the felt is clampably retained, the side flange having the bead being folded outwardly at an intermediate part of said felt portion to form a second bead, spaced from said first bead and defining the line of flexion for said felt portion, and functioning as an auxiliary clamping means for said felt portion when fastening means is applied to said weather strip through the part thereof intermediate said beads, the outwardly folded portion of said sheath constituting a drip cap overhanging the region which constitutes the range of flexion of said felt portion.

4. In a weather strip for application to swinging closures, a sheath adapted to be applied horizontally and having inner and outer flanges and a top wall connecting said flanges, and a flexible sealing strip between said inner and outer flanges and extended a substantial distance below the inner flange for direct contact with the closure, said outer flange being provided with spaced beads constituting holding devices for the sealing strip and being provided between said beads with means to accommodate fastening elements.

5. In a weather strip for application to swinging closures, a sheath adapted to be applied horizontally and having inner and outer flanges, and a flexible sealing strip between said inner and outer flanges, the outer flange being provided with spaced upper and lower beads for pressure contact with the adjacent portion of said strip, and defining an intervening attaching portion, said attaching portion being provided with means for the accommodation of fastening devices and the inner flange terminating above the plane of said attaching portion to allow said sealing strip to have direct pressure contact with the closure, the lower edge portion of the outer flange being inclined outward and normally spaced from the lower portion of said flexible sealing strip.

In testimony whereof I affix my signature.

LOUIS A. MACKLANBURG.